United States Patent
Alghooneh et al.

(10) Patent No.: US 9,841,818 B2
(45) Date of Patent: Dec. 12, 2017

(54) HAPTIC PERIPHERAL HAVING A PLURALITY OF DEFORMABLE MEMBRANES AND A MOTOR TO MOVE RADIAL PINS

(71) Applicant: Immersion Corporation, San Jose, CA (US)

(72) Inventors: Mansoor Alghooneh, Montreal (CA); Juan Manuel Cruz Hernandez, Montreal (CA); Robert Lacroix, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 66 days.

(21) Appl. No.: 14/977,556

(22) Filed: Dec. 21, 2015

(65) Prior Publication Data
US 2017/0177083 A1    Jun. 22, 2017

(51) Int. Cl.
*G08B 21/00* (2006.01)
*G06F 3/01* (2006.01)
(Continued)

(52) U.S. Cl.
CPC .............. *G06F 3/016* (2013.01); *A63F 13/24* (2014.09); *A63F 13/285* (2014.09); *G08B 6/00* (2013.01);
(Continued)

(58) Field of Classification Search
CPC ..................................................... G06F 3/016
(Continued)

(56) References Cited

U.S. PATENT DOCUMENTS 3,662,076 A    5/1972    Gordon et al.
4,514,726 A    4/1985    Whitestone et al.
(Continued)

FOREIGN PATENT DOCUMENTS

CN    1444758 A    9/2003
EP    1 574 934    9/2005
(Continued)

OTHER PUBLICATIONS

"Touch User Interface—Touch Screen and Multi Touch", Jun. 12, 2009; http://www.touchuserinterface.com/2009/06/shape-changing-mobile-phone-concept.html.
(Continued)

*Primary Examiner* — Jeffery Hofsass
(74) *Attorney, Agent, or Firm* — Medler Ferro Woodhouse & Mills PLLC

(57) ABSTRACT

A haptic peripheral includes a housing with a frame having a plurality of circumferentially-spaced apart windows, a plurality of deformable membranes positioned within the plurality of circumferentially-spaced apart windows, and a haptic output device disposed within the housing and coupled to the plurality of deformable membranes. The haptic output device includes a motor, a converter, and a plurality of radially-extending pins. Each radially-extending pin has a first end attached to the converter and a second opposing end attached to a deformable membrane. The motor is configured to receive a control signal from a processor and is configured to rotate relative to the housing in response to the control signal. The converter converts rotary motion of the motor to linear motion to move the plurality of radially-extending pins to thereby radially extend the deformable membranes relative to the housing and provide a haptic effect to a user of the haptic peripheral.

20 Claims, 12 Drawing Sheets

(51) Int. Cl.
*G08B 6/00* (2006.01)
*A63F 13/24* (2014.01)
*A63F 13/285* (2014.01)

(52) U.S. Cl.
CPC .......................... *A63F 2300/1037* (2013.01);
*G06F 2203/013* (2013.01)

(58) Field of Classification Search
USPC ........................................... 340/407.1, 407.2
See application file for complete search history.

(56) References Cited

U.S. PATENT DOCUMENTS

| | | | |
|---|---|---|---|
| 5,453,012 A | 9/1995 | Hudecek | |
| 5,772,440 A | 6/1998 | Ida | |
| 5,821,920 A | 10/1998 | Rosenberg et al. | |
| 5,844,392 A | 12/1998 | Peurach et al. | |
| 6,106,301 A | 8/2000 | Merril | |
| 6,470,302 B1 | 10/2002 | Cunningham et al. | |
| 6,641,480 B2 | 11/2003 | Murzanski et al. | |
| 6,697,043 B1 | 2/2004 | Shahoian | |
| 6,717,573 B1 | 4/2004 | Shahoian et al. | |
| 6,927,528 B2 | 8/2005 | Barillot et al. | |
| 6,929,481 B1 | 8/2005 | Alexander et al. | |
| 7,182,691 B1 | 2/2007 | Schena | |
| 7,196,688 B2 | 3/2007 | Schena | |
| 7,228,212 B2 | 6/2007 | Hijikata et al. | |
| 7,277,080 B2 | 10/2007 | Goulthorpe | |
| 7,289,106 B2 | 10/2007 | Bailey et al. | |
| 7,308,831 B2 | 12/2007 | Cunningham et al. | |
| 7,355,595 B2 | 4/2008 | Bathiche et al. | |
| 8,342,853 B2 | 1/2013 | Cohen | |
| 2002/0054060 A1 | 5/2002 | Schena | |
| 2002/0058549 A1 | 5/2002 | Armstrong | |
| 2004/0046739 A1 | 3/2004 | Gettemy | |
| 2005/0057528 A1 | 3/2005 | Kleen | |
| 2005/0219205 A1 | 10/2005 | Bailey et al. | |
| 2007/0117077 A1 | 5/2007 | Gordon et al. | |
| 2007/0152974 A1 | 7/2007 | Kim et al. | |
| 2007/0244641 A1 | 10/2007 | Altan et al. | |
| 2008/0100568 A1 | 5/2008 | Koch et al. | |
| 2008/0169911 A1 | 7/2008 | Klinghult et al. | |
| 2008/0246735 A1 | 10/2008 | Reynolds et al. | |
| 2009/0007758 A1 | 1/2009 | Schlosser et al. | |
| 2009/0085879 A1 | 4/2009 | Dai et al. | |
| 2010/0283727 A1 | 11/2010 | Jiang et al. | |
| 2010/0283731 A1 | 11/2010 | Grant et al. | |

FOREIGN PATENT DOCUMENTS

| | | |
|---|---|---|
| JP | 2005-328270 A | 11/2005 |
| JP | 2012-526331 A | 10/2012 |
| KR | 2014-0112871 | 9/2014 |
| WO | 97/05592 A1 | 2/1997 |
| WO | 2008/086904 A1 | 7/2008 |
| WO | 2009/045748 A1 | 4/2009 |
| WO | 2015/146116 | 10/2015 |

OTHER PUBLICATIONS

Tomohiro Amemiya et al., "Haptic Direction Indicator for Visually Impaired People Based on Pseudo-Attraction Force", International Journal on Human-Computer Interaction, vol. 1 No. 5; Mar. 2009; ISSN: 1697-9613; pp. 23-34.

Tomohiro Amemiya et al., "Lead-me Interface for a Pulling Sensation from Hand-held Devices", ACM Transactions on Applied Perceptions; vol. 5 Issue 3; Article 15; Aug. 2008; pp. 15-15:17.

Tomohiro Amemiya et al., "Virtual Force Display Direction Guidance using Asymmetric Acceleration via Periodic Translational Motion", Proceedings of the First Joint Eurohaptics Conference and Symposium on Haptic Interfaces for Virtual Environment and Teleoperator Systems; 2005 IEEE, pp. 619-622.

Oliver Bau et al., "BubbleWrap: A Textile-Based Electromagnetic Haptic Display", CHI 2009: Extended Abstracts on Human Factors in Computing Systems; Apr. 4-9, 2009; pp. 3607-3612.

Fabian Hemmert et al., "Dynamic Knobs: Shape change as a means of interaction on a mobile phone", CHI 2008: Extended Abstracts on Human Factors in Computing Systems (Apr. 5-10, 2008); pp. 2309-2314.

Fabian Hemmert et al., "Shape Changing Mobiles Tapering in One Dimensional Deformational Displays in Mobile Phones", TEI 2010 Proceedings of the 4th International Conference on Tangible, Embedded and Embodied Interaction (Jan. 25, 2010); pp. 249-252.

G Michelitsch et al., "Haptic Chameleon: A New Concept of Shape-Changing User Interface Controls with Force Feedback", CHI 2004: Extended Abstracts on human factors in computing systems (Apr. 24-29, 2004); pp. 1305-1308.

Norio Nakamura et al., "An Innovative Non-Grounding Haptic Interface 'GyroCubeSensuous' displaying Illusion Sensation of Push, Pull and Lift", National Institute of Advance Industrial Science and Technology; ACM; Jul. 31, 2005.

Norio Nakamura et al., "Development of a Force and Torque Hybrid Display 'GyroCubeStick'", Second Joint EuroHaptics Conference and Symposium on Haptic Interfaces for Virtual Environment and Teleoperator Systems; 2005 IEEE; pp. 633-634.

Norio Nakamura et al., "Development of Fingertip Type Non-grounding Force Feedback Display", WHC'07 Proceedings of the Second Joint EuroHaptics Conference and Symposium on Haptic Interfaces for Virtual Environment and Teleoperator Systems; 2007 IEEE; pp. 582-583.

William R. Provancher, "Creating Greater VR Immersion by Emulating Force Feedback with Ungrounded Tactile Feedback"; IQT Quarterly vol. 6 No. 2; 2014; pp. 18-21.

Colin Swindells et al., "TorqueBAR: An Ungrounded Haptic Feedback Device"; ICMI '03: Proceedings of the 5th international conference on Multimodal interfaces; 2003, pp. 52-59.

Hiroaki Yano et al., "Development of Non-grounded Haptic Interface Using the Gyro Effect", Proceedings of the 11th Symposium on Haptic Interfaces for Virtual Environment and Teleoperator Systems; 2003 IEEE; pp. 1-8.

Extended European Search Report issued in EP Application No. 16204276.6, dated May 12, 2017.

Extended European Search Report, issued in EP Application No. 16198135.2, dated May 31, 2017.

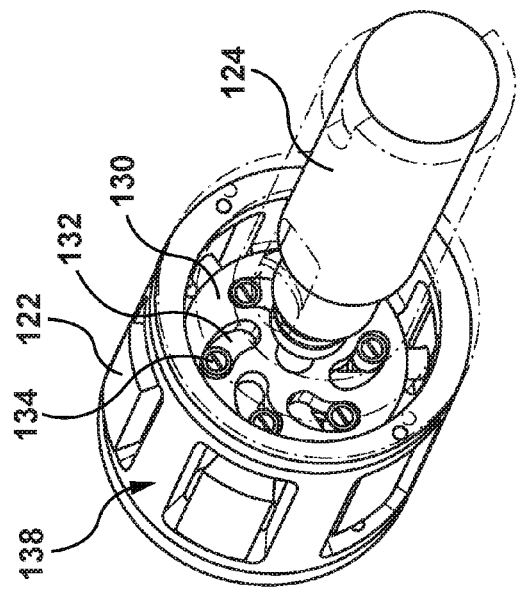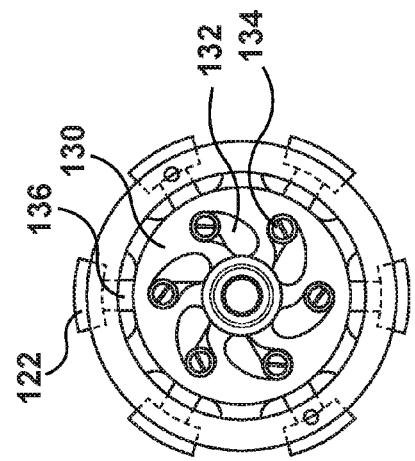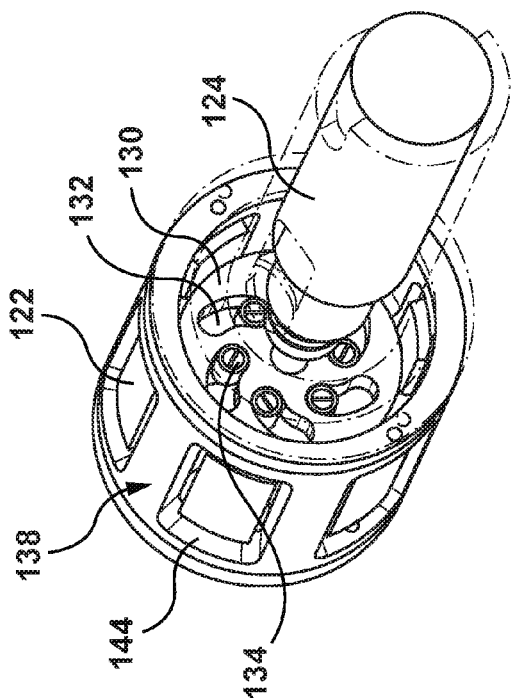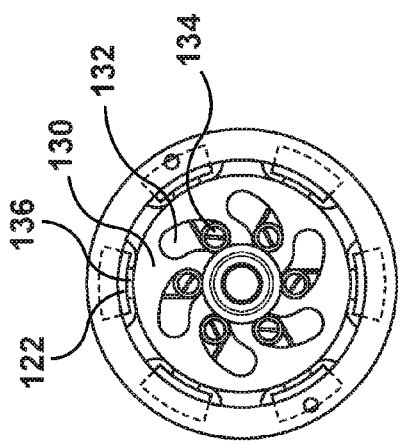

HAPTIC PERIPHERAL HAVING A PLURALITY OF DEFORMABLE MEMBRANES AND A MOTOR TO MOVE RADIAL PINS

FIELD OF THE INVENTION

Embodiments hereof relate to haptic effects and more particularly relate to a haptic peripheral having a plurality of deformable membranes to provide haptic effects to a user.

BACKGROUND OF THE INVENTION

Video games and video game systems have become even more popular due to the marketing toward, and resulting participation from, casual gamers. Conventional video game devices or controllers use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Other devices, such as medical devices, automotive controls, remote controls, and other similar devices wherein a user interacts with a user input elements to cause an action also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed devices to alert the user to specific events, or provide realistic feedback to user regarding interaction of the medical device with the patient at the distal end of the medical device.

Conventional haptic feedback systems for gaming, virtual reality, and other devices generally include one or more actuators attached to or contained within the housing of the controller/peripheral for generating the haptic feedback. One problem occurring in commercially-available implementations of haptic feedback devices is that the devices are very bulky because such devices employ large motors and require large power supplies to operate. These features make it difficult to integrate compelling haptic feedback into a smaller interface device such as a handheld gamepad, joystick, remote control, or other device. Yet, these controllers are preferred input devices for many types of systems, especially home video game consoles, and are also preferred by many consumers.

Embodiments hereof relate to a haptic feedback system that provides a deformation haptic effect via a smaller interface device such as a handheld peripheral for a gaming or virtual reality system.

BRIEF SUMMARY OF THE INVENTION

Embodiments hereof are directed to a haptic peripheral that includes a housing, a plurality of deformable membranes, and a haptic output device disposed within the housing and coupled to the plurality of deformable membranes. The housing includes a frame having a plurality of spaced apart windows. Each deformable membrane is positioned within one of the plurality of spaced apart windows of the frame. The haptic output device includes a motor, a cam plate coupled to the motor and having a plurality of tracks defined therethrough, a plurality of rollers, and a plurality of radially-extending pins. Each roller is slidably positioned within one of the plurality of tracks of the cam plate. Each radially-extending pin has a first end attached to one of the plurality of rollers and a second opposing end attached to one of the deformable membranes. The motor is configured to receive a control signal from a processor and is configured to rotate the cam plate relative to the housing in response to the control signal from the processor. Rotation of the cam plate moves the plurality of rollers and the plurality of radially-extending pins to thereby radially extend the deformable membranes relative to the housing and provide a haptic effect to a user of the haptic peripheral.

According to another embodiment hereof, a haptic peripheral includes a housing, a plurality of deformable membranes, and a haptic output device disposed within the housing and coupled to the plurality of deformable membranes. The housing includes a frame having a plurality of spaced apart windows. Each deformable membrane is positioned within one of the plurality of spaced apart windows of the frame. The haptic output device includes a motor, a converter, and a plurality of radially-extending pins. The converter extends between the motor and the plurality of radially-extending pins. Each radially-extending pin has a first end attached to the converter and a second opposing end attached to one of the deformable membranes. The motor is configured to receive a control signal from a processor and is configured to rotate relative to the housing in response to the control signal from the processor. The converter converts rotary motion of the motor to linear motion to move the plurality of radially-extending pins to thereby radially extend the deformable membranes relative to the housing and provide a haptic effect to a user of the haptic peripheral.

According to another embodiment hereof, a gaming system includes a host computer, a processor, and a haptic peripheral. The haptic peripheral includes a housing, a plurality of deformable membranes, and a haptic output device disposed within the housing and coupled to the plurality of deformable membranes. The housing includes a frame having a plurality of spaced apart windows. Each deformable membrane is positioned within one of the plurality of spaced apart windows of the frame. The haptic output device includes a motor, a converter, and a plurality of radially-extending pins. The converter extends between the motor and the plurality of radially-extending pins. Each radially-extending pin has a first end attached to the converter and a second opposing end attached to one of the deformable membranes. The motor is configured to receive a control signal from a processor and is configured to rotate relative to the housing in response to the control signal from the processor. The converter converts rotary motion of the motor to linear motion to move the plurality of radially-extending pins to thereby radially extend the deformable membranes relative to the housing and provide a haptic effect to a user of the haptic peripheral.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 7 is a perspective view of the haptic peripheral of FIG. 1, wherein a motor casing of the housing of the haptic peripheral and an end plate of the housing of the haptic peripheral are shown in phantom to illustrate the internal components thereof and the haptic peripheral is shown in its nominal or non-deformed state.

FIG. 7A is an end view of FIG. 7, wherein the frame of the housing of the haptic peripheral is not shown for sake of clarity.

FIG. 8 is a perspective view of the haptic peripheral of FIG. 1, wherein a motor casing of the housing of the haptic peripheral and an end plate of the housing of the haptic peripheral are shown in phantom to illustrate the internal components thereof and the haptic peripheral is shown in its expanded or deformed state.

FIG. 8A is an end view of FIG. 8, wherein the frame of the housing of the haptic peripheral is not shown for sake of clarity.

DETAILED DESCRIPTION OF THE INVENTION

Specific embodiments of the present invention are now described with reference to the figures, wherein like reference numbers indicate identical or functionally similar elements.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is directed to gaming devices and controllers for gaming devices, those skilled in the art would recognize that the description applies equally to other haptic feedback devices.

Embodiments hereof relate to a haptic peripheral of a haptic feedback system, the haptic peripheral including a housing, a plurality of deformable membranes, and a haptic output device disposed within the housing and coupled to the plurality of deformable membranes. The haptic output device is configured to receive a control signal from a processor and is configured to radially extend the deformable membranes relative to the housing and provide a haptic effect to a user of the haptic peripheral. The haptic peripheral is a graspable device with multiple deformable membranes or regions that can provide unique and highly dynamic non-vibration haptic feedback to the user that significantly improve the quality of user experience in virtual reality and video gaming interactions. In this device, due to a custom designed haptic output device, the rotary motion of a motor can be converted to multiple linear motions in perpendicular axes with very low friction. Advantages of haptic peripherals described herein include that the haptic peripheral has multiple deformable regions or membranes and can generate deformation-based haptics with 200 N of force, 10 mm of deformation, and 10 Hz of deformation bandwidth.

Figure 1:
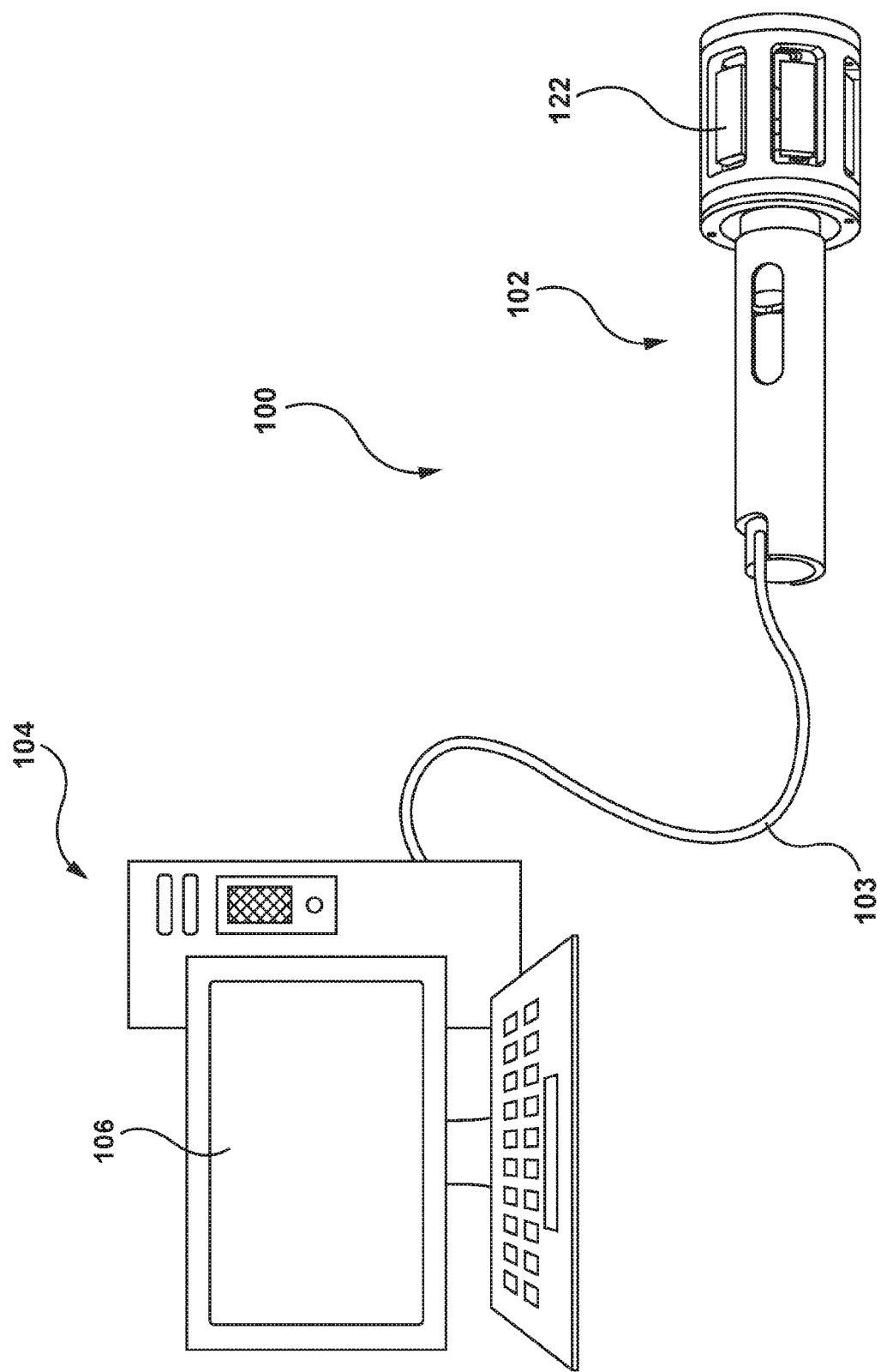
FIG. 1 is a schematic illustration of a system including a haptic peripheral according to an embodiment hereof, wherein the system also includes a host computer and display.
Figure 2:
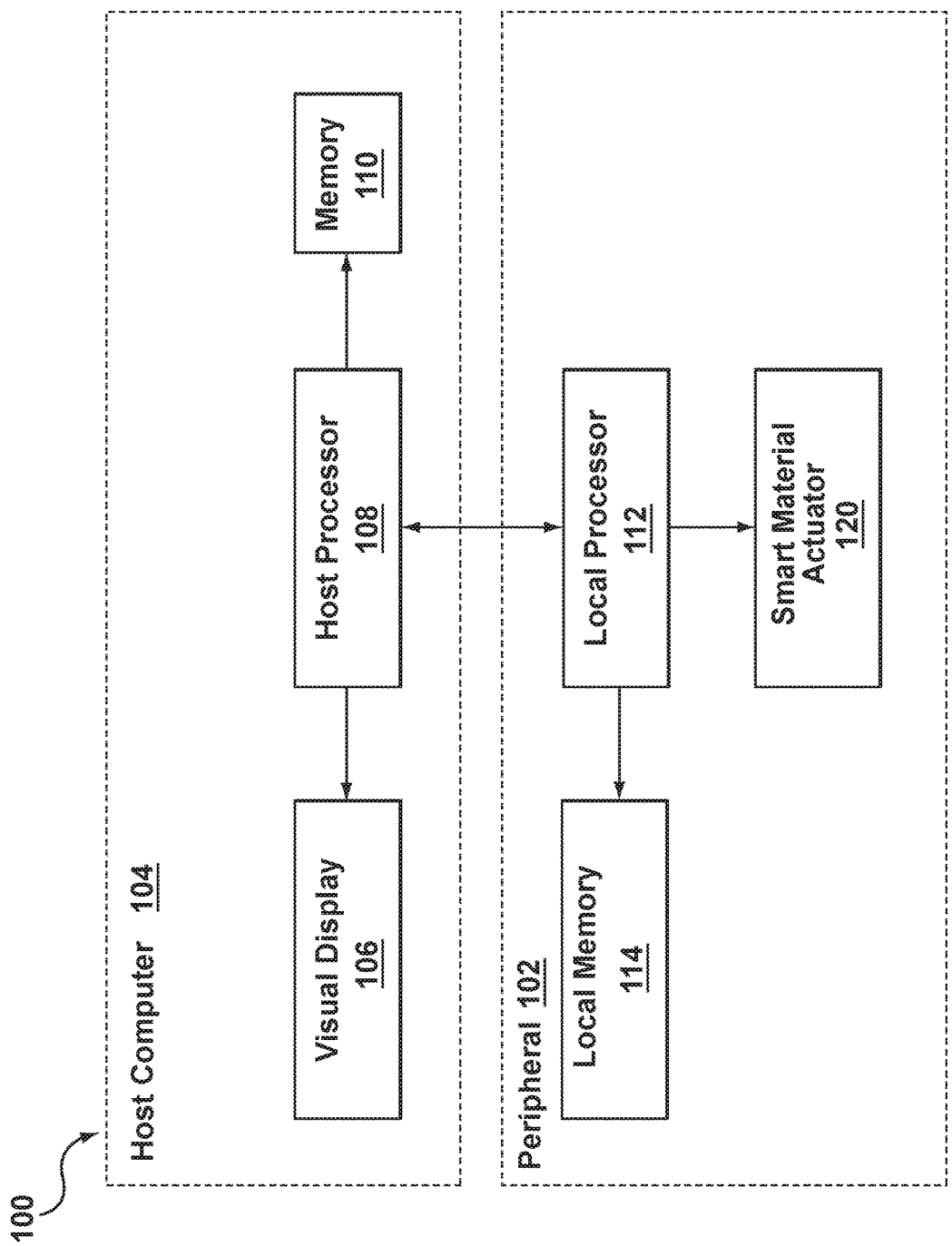
FIG. 2 is a block diagram of the system of FIG. 1.

More particularly, with reference to the figures, FIG. 1 is a schematic illustration of a haptic feedback system 100 including a haptic peripheral 102, a host computer 104, and a display 106. FIG. 2 is a block diagram of the system of FIG. 1. Haptic peripheral 102 is in communication with host computer or computer system 104 that is configured to generate a virtual environment to a user on video or visual display 106. Host computer 104 may include a video game console, mobile device, or any other type of computer system that contains a processor configured to generate a virtual environment to a user on a display. As shown in the block diagram of FIG. 2, host computer 104 includes a host processor 108, a memory 110, and visual display 106. Host computer 104 executes a software application that is stored in memory 110 and is executed by host processor 108. Host processor 108 may be any type of general purpose processor, or could be a processor specifically designed to provide haptic effect signals. Host processor 108 may be the same processor that operates the entire host computer 104, or may be a separate processor. Host processor 108 can decide what haptic effects to send to haptic peripheral 102 and in what order to send the haptic effects. Memory 110 may be any type of storage device or computer-readable medium, such as but not limited to random access memory (RAM) or read-only memory (ROM). Memory 110 may also be located internal to the host processor, or any combination of internal and external memory.

Host computer 104 is coupled to visual display 106 via wired or wireless means. Visual display 106 may be any type of medium that provides graphical information to a user; this includes but is not limited to monitors, television screens, plasmas, LCDs, projectors, or any other display devices. In an embodiment, host computer 104 is a gaming device console and visual display 106 is a monitor which is coupled to the gaming device console, as known in the art. In another embodiment, as known to those skilled in the art, host computer 104 and visual display 106 may be combined into a single device.

In the embodiment shown in FIGS. 1-2, host computer 104 is in communication with haptic peripheral 102 through a wired or USB connection 103. However, in other embodiments, haptic peripheral 102 may communicate with host computer 104 using other wired communication or wireless communication means known to those of skill in the art. This can include but is not limited to a serial or Bluetooth connection. Further, host computer 104 may be in the cloud and thus is not required to be wired or connected wirelessly in a local fashion.

As shown in the block diagram of FIG. 2, haptic peripheral 102 includes a local processor 112 which communicates with host computer 104 via connection 103, a local memory 114, and a haptic output device 120. In operation, local processor 112 is coupled to haptic output device 120 to provide control signals thereto based on high level supervisory or streaming commands from host computer 104. For example, when in operation, voltage magnitudes and durations are streamed from host computer 104 to haptic peripheral 102 where information is provided to haptic output device 120 via local processor 112. Host computer 104 may provide high level commands to local processor 112 such as the type of haptic effect to be output (e.g. vibration, jolt, detent, pop, etc.) by haptic output device 120, whereby the local processor 112 instructs haptic output device 120 as to particular characteristics of the haptic effect which is to be output (e.g. magnitude, frequency, duration, etc.). Local processor 112 may retrieve the type, magnitude, frequency, duration, or other characteristics of the haptic effect from a local memory 114 coupled thereto (shown in the block diagram of FIG. 2). In addition, similar to memory 110 of host computer 104, local memory 114 that can be any type of storage device or computer-readable medium, such as but not limited to random access memory (RAM) or read-only memory (ROM). Local memory 114 may also be located internal to the local processor, or any combination of internal and external memory. Similar to host processor 108, local processor 112 also can decide what haptic effects to send and what order to send the haptic effects. In another embodiment hereof, haptic peripheral 102 is configured to not include local processor 112, whereby all input/output signals from haptic peripheral 102 are handled and processed directly by host computer 104.

Figure 13:
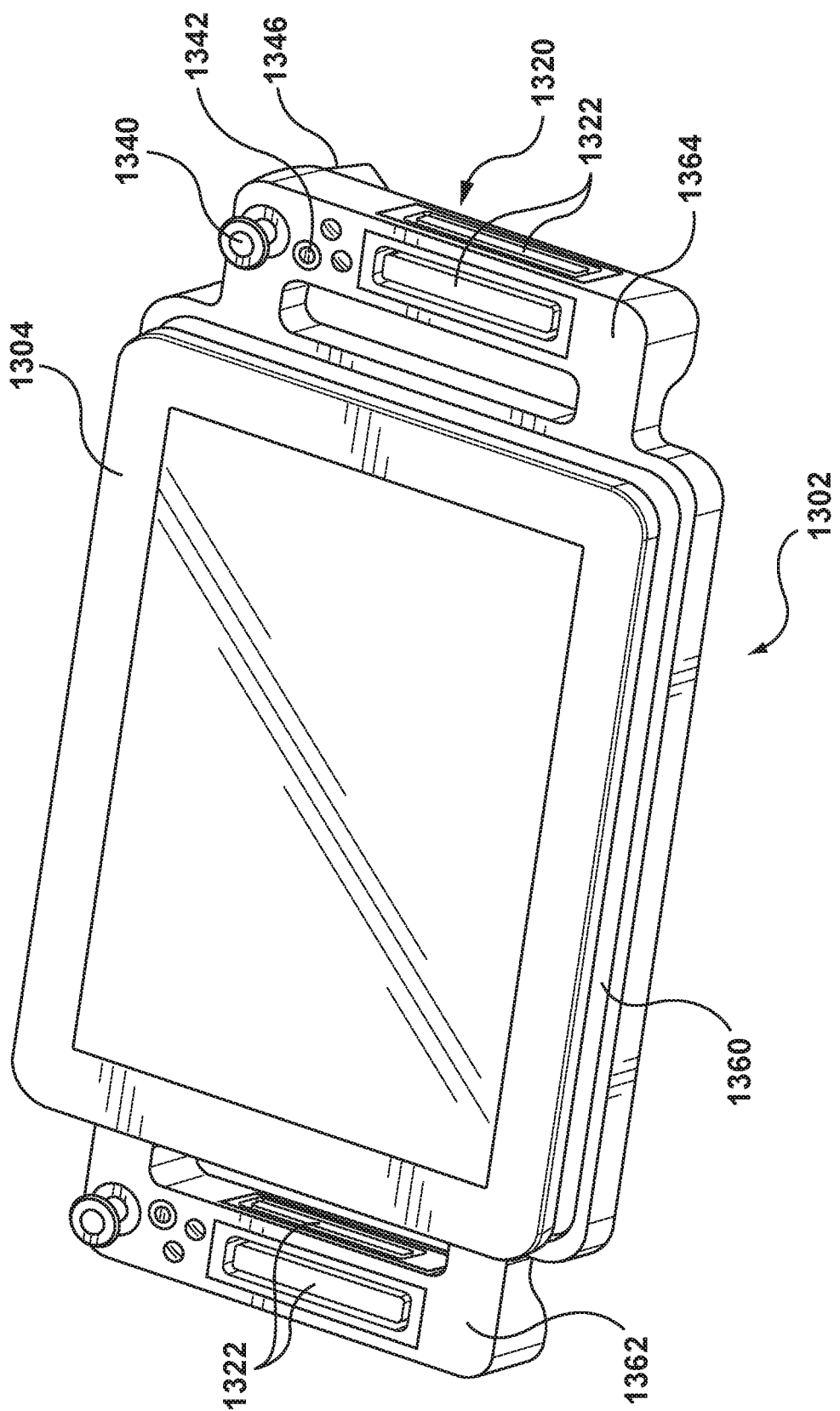
FIG. 13 is a perspective view of a haptic peripheral according to another embodiment hereof, wherein the haptic peripheral is a gaming tablet that includes deformable membranes for providing haptic effects to a user.
Figure 14:
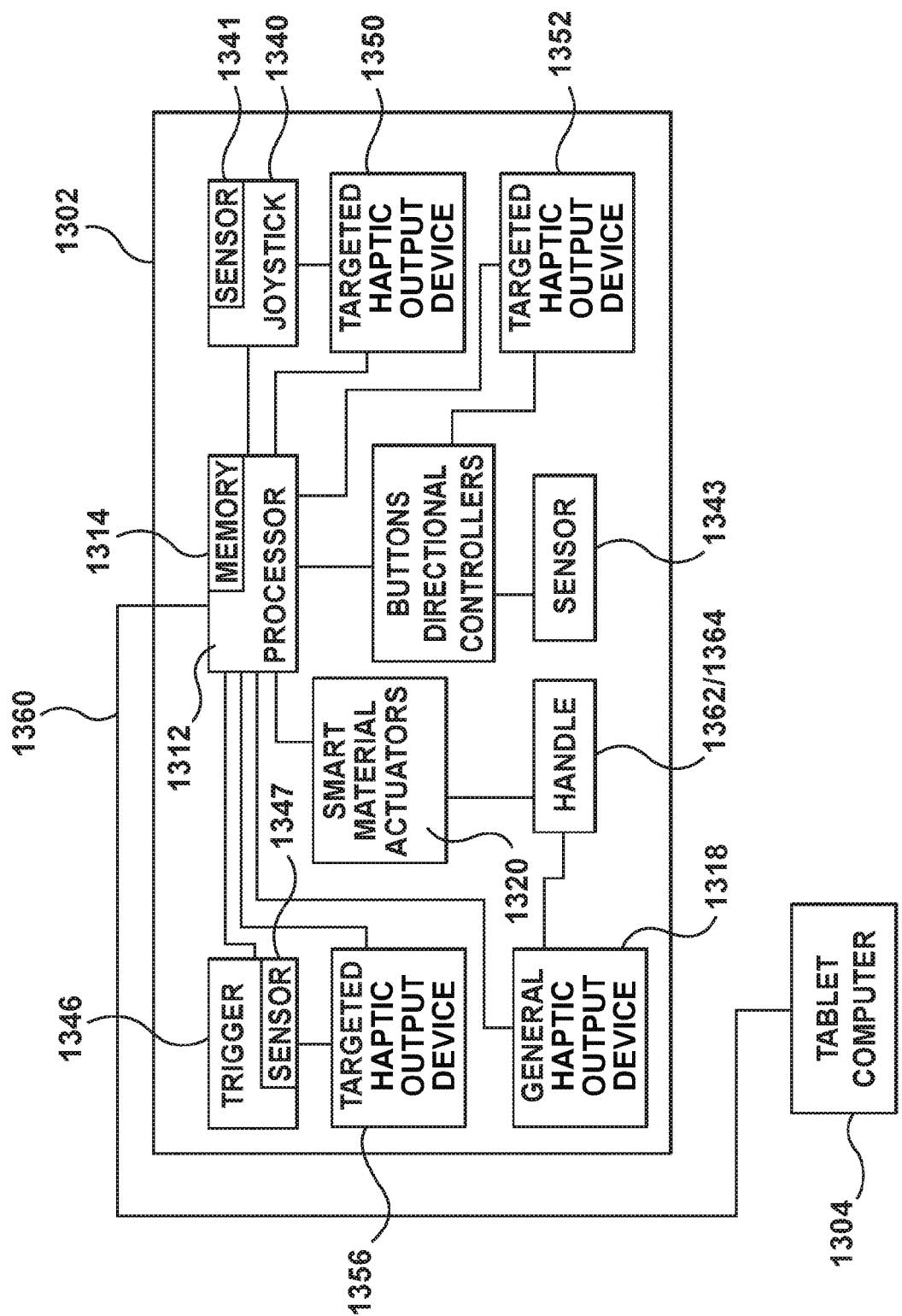
FIG. 14 is a block diagram of the gaming table of FIG. 13.

In the embodiment of FIGS. 1-2, haptic peripheral 102 is a graspable device (i.e., a device that is configured to be grasped by a hand or palm of a user). Further, haptic peripheral 102 is configured to output haptic effects as will be described in more detail herein but in this embodiment does not include a user input element or manipulandum used to input actions or otherwise interact with the video game and update the virtual environment as known in the art. However, those skilled in the art would recognize that haptic peripheral 102 may be modified to include one or more user input elements or manipulandums. Movements of user input elements or manipulandums represent inputs from the user which allows the user to interact with the software applications running on host computer 104, including but not limited to video games relating to first person shooter, third person character interaction, vehicle related games, or computer simulations. Movements of user input elements or manipulandums may provide host computer 104 with input corresponding to the movement of a computer generated graphical object, such as a cursor or other image, or some other graphical object displayed by the host computer 104 via visual display 106, or to control a virtual character or gaming avatar, such as a person, vehicle, or some other entity that may be found in a game or computer simulation. Further, those skilled in the art would recognize that haptic peripheral 102 is merely an exemplary embodiment of a haptic peripheral and that haptic peripherals with other configurations, shapes, and sizes may be used. For example, as will be described in more detail herein, the haptic peripheral may be a handheld gaming controller that may be used with a tablet computer as shown in FIGS. 13-14 or other controllers such as, but not limited to, mobile phones, personal digital assistants (PDA), tablets, computers, gaming peripherals, and other controllers for virtual reality systems known to those skilled in the art.

Figure 3:
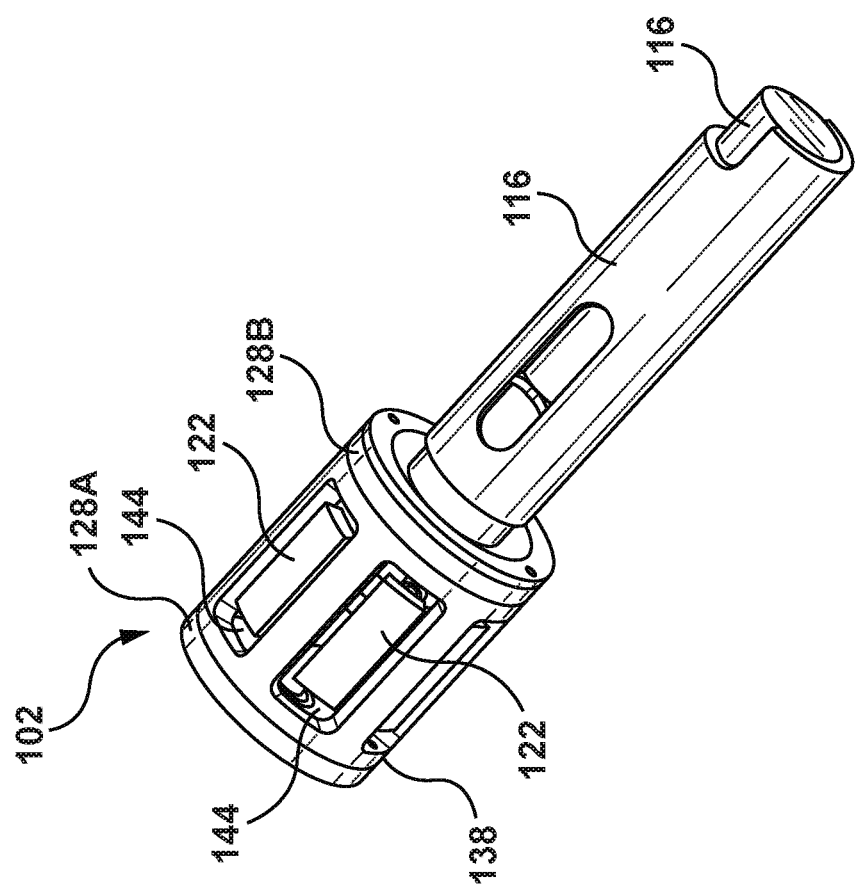
FIG. 3 is a perspective view of the haptic peripheral of FIG. 1.
Figure 5:
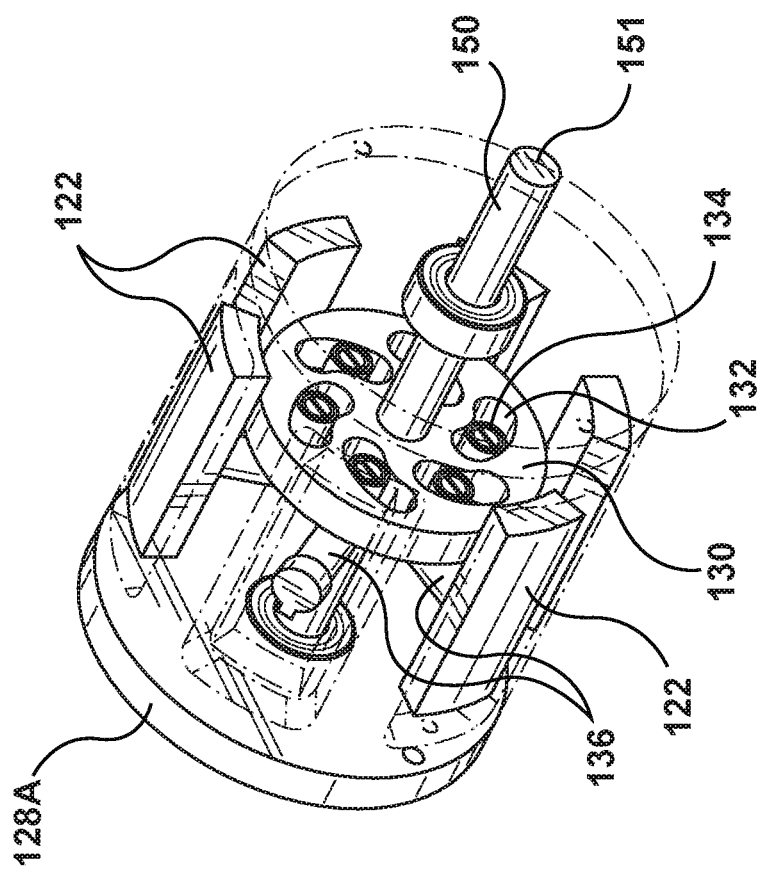
FIG. 5 is an enlarged perspective view of a portion of the haptic peripheral of FIG. 1, wherein a frame of a housing of the haptic peripheral is shown in phantom to illustrate the internal components thereof.
Figure 6:
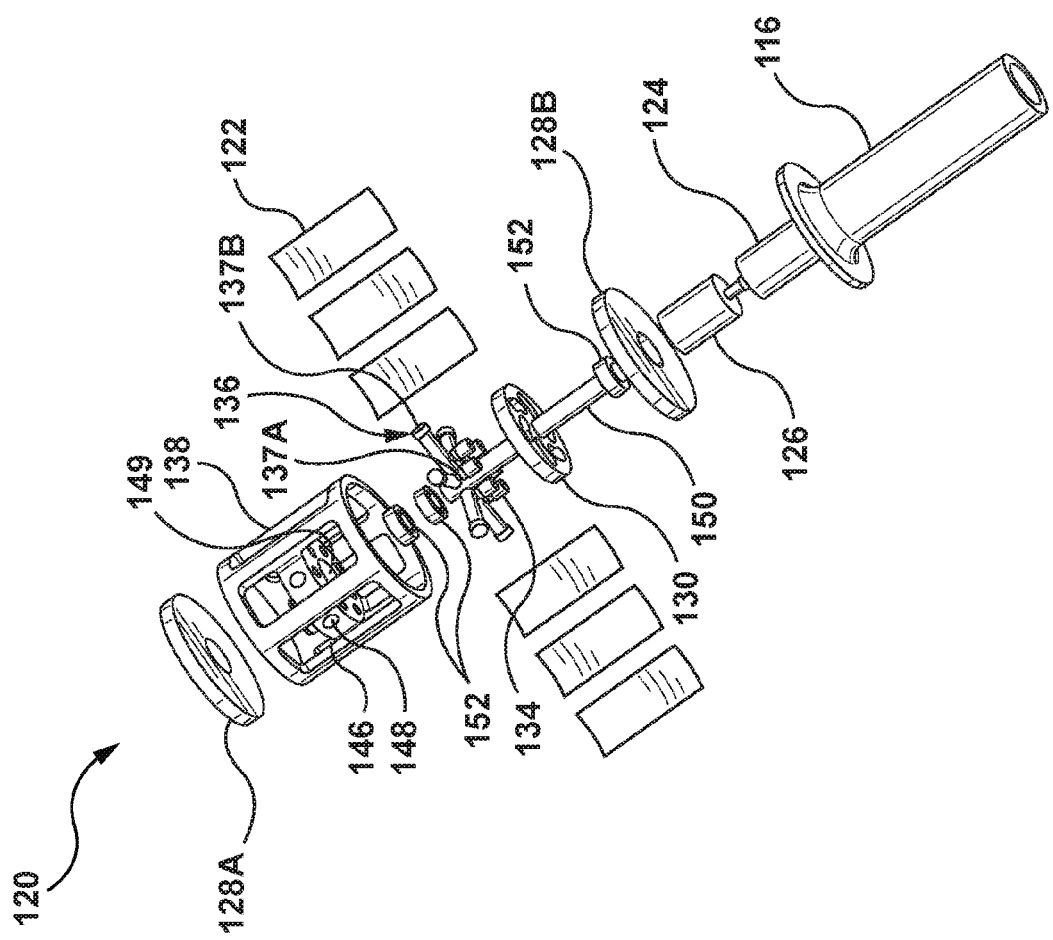
FIG. 6 is an exploded perspective view of the haptic peripheral of FIG. 1.

Haptic peripheral 102 includes a housing 116, a plurality of deformable membranes or coverings 122, and haptic output device 120 which is disposed within housing 116 and coupled to the plurality of deformable membranes 122. Haptic output device 120 will be described in more detail with reference to FIGS. 4, 5, and 6 herein, while housing 116 and the plurality of deformable membranes 122 will first be described with reference to FIGS. 3 and 6. FIG. 3 is a perspective view of haptic peripheral 102, while FIG. 6 is an exploded perspective view of haptic peripheral 102.

More particularly, in this embodiment, housing 116 includes a frame 138 and a motor casing 139. Frame 138 and motor casing 139 are disposed adjacent to or in series with each other and are coupled together such that housing 116 of haptic peripheral 102 is a single device. Motor casing 139 houses a motor 124 of haptic output device 120. Frame 138 has a plurality of circumferentially-spaced apart windows 144, and each deformable membrane 122 is positioned within one of the plurality of circumferentially-spaced apart windows 144 of frame 138. In this embodiment, haptic peripheral 102 includes six deformable membranes 122 and thus also includes six corresponding circumferentially-spaced apart windows 144 within frame 138. However, as will be understood by one of ordinary skill in the art, the haptic peripheral may be modified to have a fewer or greater number of deformable membranes. Each deformable membrane 122 is configured to contact a user and is formed from a flexible material such as but not limited to synthetic rubber such as neoprene or another suitable polymer. Although the deformable membranes and corresponding spaced apart windows are illustrated in a cylindrical layout, i.e., extending around and/or forming a circumference of a cylindrical handle, it will be understood by one of ordinary skill in the art that the deformable membranes and corresponding windows may cover or extend around a handle having any shape or profile and thus the deformable membranes and corresponding windows may include or form arbitrarily curved surfaces. Stated another way, frame 138 is not required to be cylindrical and deformable membranes 122 and corresponding spaced apart windows 144 are not required to be positioned in a cylindrical layout.

Frame 138 includes a first annular base 140A, a second opposing annular base 140B, and a plurality of dividers or slats 142 longitudinally extending between first and second annular bases 140A, 140B in order to form circumferentially-spaced apart windows 144. Although described separately herein, first and second annular bases 140A, 140B and slats 142 may be integrally formed as a single component or structure. As best shown on the exploded view of FIG. 6, frame 138 further includes a central plate or disc 146 having a plurality of radially-extending openings or passageways 148 formed therein. In this embodiment, central disc 146 includes six radially-extending openings or passageways 148 that correspond with the six deformable membranes 122. Central disc 146 is longitudinally centered within frame 138 and is coupled or attached to slats 142. Central disc 146 is circumferentially oriented such that each passageway 148 is circumferentially centered within its corresponding window 144 of frame 138. Central disc 146 also includes a central opening or passageway 149 for receiving a camshaft 150 of haptic output device 120 as will be described in more detail herein. Housing 116 further includes a first or top cover plate 128A and a second or bottom cover plate 128B that are disposed adjacent to and coupled to first and second annular bases 140A, 140B, respectively, of frame 138. Top and bottom cover plates 128A, 128B function to enclose and protect the internal components housed within frame 138.

Figure 4:
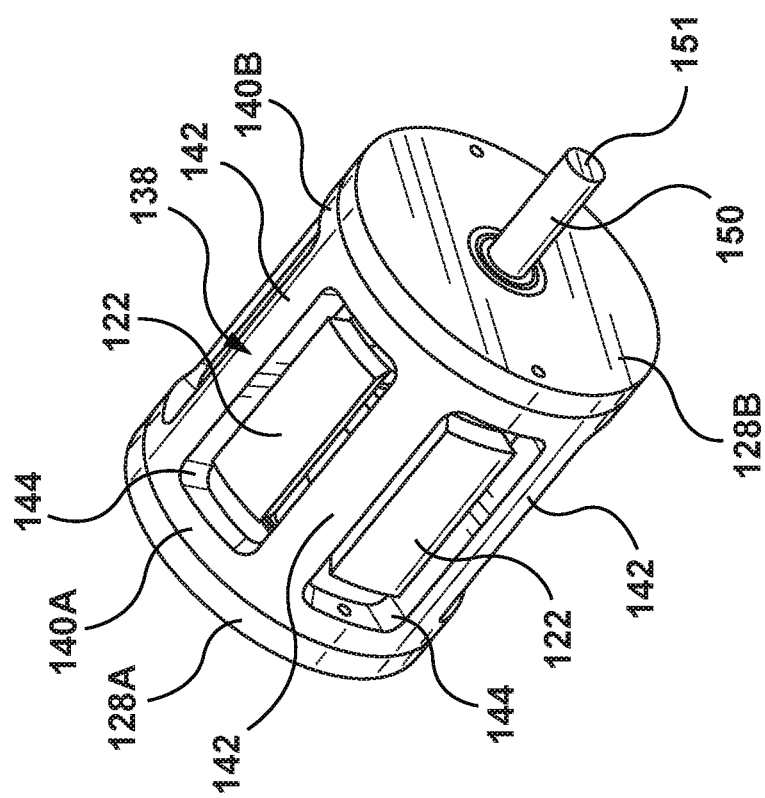
FIG. 4 is an enlarged perspective view of a portion of the haptic peripheral of FIG. 1.

Haptic output device 120 will now be described in more detail. FIG. 4 is an enlarged perspective view of a portion of haptic peripheral 102, and FIG. 5 is the same view as FIG. 4 except that frame 138 of housing 116 and bottom cover plate 128B of housing 116 are shown in phantom to illustrate the internal components housed within frame 138. Haptic output device 120 includes motor 124 (see exploded view of FIG. 6), camshaft 150, a cam plate 130 coupled to motor 124 via camshaft 150, a plurality of rollers 134, and a plurality of radially-extending shafts or pins 136. A drive end 151 of camshaft 150 is operably connected to a drive shaft of motor 124. Motor 124 can be connected directly to camshaft 150, such as with a shaft coupler 126. Motor 124 may be back-drivable or bidirectional. In an embodiment, motor 124 is a DC motor such as a Maxon Motor model Maxon-DCX22L 18V-10W available from Maxon Motor, Ag of Switzerland, and shaft coupler 126 is a planetary gearbox (model GPX22) of a gear ratio of 44. In another embodiment, motor 124 is EC-max 16 brushless, 5W, and shaft coupler 126 is a planetary gearbox (GP 16A) of a gear ratio of 19.

Cam plate 130 defines a plurality of tracks 132 therethrough. As best shown in FIG. 5, each track 132 is a curved opening or otherwise stated is an opening that forms a curved or kidney-shaped path or passageway. In this embodiment, cam plate 130 includes six tracks 132 that correspond with the six deformable membranes 122 of haptic peripheral 102. Cam plate 130 is a rotating component or element that converts or transforms rotary motion into linear motion as will be described in more detail herein. Each roller 134 is slidably positioned within one of the plurality of tracks 132 of cam plate 130. Each roller 134 is sized to be positioned within a track 132 of cam plate 130 and configured to move back and forth along or within its respective track 132 as cam plate 130 rotates. Each radially-extending pin 136 has a first end 137A attached to one of the plurality of rollers 134 and a second opposing end 137B attached to one of the deformable membranes 122. Thus, radially-extending pins 136 extend between rollers 134 and deformable membranes 122. Each radially-extending pin 136 is slidably positioned within one of the plurality of radially-extending passageways 148 of central disc 146 of frame 138.

In operation, motor 124 is configured to receive a control signal from host processor 108 and/or local processor 112 and is configured to rotate in response to the control signal. Rotation of motor 124 causes rotation of cam plate 130 due to camshaft 150 which extends between and is coupled to both motor 124 and cam plate 130. Cam plate 130 is pivoted at this center. When cam plate 130 rotates, the plurality of rollers 134 slide back and forth within tracks 132 of cam plate 130. The plurality of pins 136, which are attached to rollers 134, move in a radial direction in conjunction with the movement of rollers 134 and thus the plurality of deformable membranes 122, which are attached to pins 136, are also moved in a radial direction in conjunction with the movement of rollers 134. Rotation of cam plate 130 thus moves the plurality of rollers 134 and the plurality of radially-extending pins 136 to thereby radially extend deformable membranes 122 relative to housing 116. Cam plate 130 thus converts or transforms the rotary motion of motor 124 to linear motion of radially-extending pins 130, as well as deformable membranes 122 attached thereto. The shape or configuration of tracks 132 of cam plate 130 thus controls or determines the movement of rollers 134, and thus is designed to result in radial movement of radially-extending pins 130 and deformable membranes 122 attached thereto. As the plurality of rollers 134 move back and forth within their respective track 132, radially-extending pins 130 and deformable membranes 122 attached thereto are radially extended or expanded and radially contracted or retracted relative to housing 116.

Rollers 134 are cylindrical components preferably formed from a low-friction material such as but not limited to stainless steel. In addition, a plurality of bearings 152 are positioned at various locations of haptic output device 120 in order to reduce the load on camshaft 150 during rotation of motor 124 and cam plate 130. Bearings 152 are annular or tubular elements that constrain relative motion to only the desired motion and reduce or minimize friction between moving parts. Depending upon the position of bearing 152 within haptic output device 120, the bearing may provide for free linear movement of the moving part or for free rotation around a fixed axis.

Operation of haptic output device 120 to produce deformation haptic effects to a user of haptic peripheral 102 will now be discussed in more detail with respect to FIGS. 7-8. FIG. 7 is a perspective view of haptic peripheral 102, wherein motor casing 139 of housing 116 and bottom cover plate 128B of housing 116 are shown in phantom to illustrate the internal components thereof and haptic peripheral 102 is shown in its nominal or non-deformed state. FIG. 7A is an end view of FIG. 7, wherein frame 138 of housing 116 is not shown for sake of clarity. Similarly, FIG. 8 is a perspective view of haptic peripheral 102, wherein motor casing 139 of housing 116 and bottom cover plate 128B of housing 116 are shown in phantom to illustrate the internal components thereof. However, in FIG. 8, haptic peripheral 102 is shown in its expanded or deformed state with deformable membranes 122 radially expanded or extended via haptic output device 120. FIG. 8A is an end view of FIG. 8, wherein frame 138 of housing 116 is not shown for sake of clarity.

Host processor 108 and/or local processor 112 generates a control signal or output that directs motor 124 to rotate camshaft 150 at a predetermined speed and/or to a predetermined position, thereby causing haptic output device 120 to induce desired motion of deformable membranes 122 to produce haptic feedback or effects to a user. More particularly, haptic feedback system 100 includes a power source for supplying an electrical charge to motor 124 and haptic feedback system 100 also includes host processor 108 and/or local processor 112 which controls the power source and thus determines the magnitude and frequency of the applied electrical charge. Accordingly, the power source is configured to receive a control signal from host processor 108 and/or local processor 112 and is configured to apply an electrical charge to motor 124 in accordance with the control signal received from host processor 108 and/or local processor 112. The power source may be located within haptic peripheral 102 or host computer 104.

Motor 124 is configured to receive the output or control signal from host processor 108 and/or local processor 112 and rotate in response thereto. As explained above, rotation of motor 124 and cam plate 130 moves the plurality of rollers 134 and the plurality of radially-extending pins 136 to thereby radially extend deformable membranes 122 relative to housing 116. Tracks 132 of cam 130 control or drive motion of rollers 134, which in turn push or radially move pins 136 from the nominal or non-deformed configuration of FIGS. 7 and 7A in which radially-extending pins 136 are completely or entirely housed within radially-extending passageways 148 of central disc 146 of frame 138 to the expanded or deformed configuration of FIGS. 8 and 8A in which radially-extending pins 136 are at least partially pushed or extended outside of frame 138. Deformable membranes 122, attached to radially-extending pins 136, are similarly moved from the nominal or non-deformed configuration of FIGS. 7 and 7A in which the deformable membranes are positioned within circumferentially-spaced apart windows 144 of frame 138 and substantially flush with an outer surface of frame 138 to the expanded or deformed configuration of FIGS. 8 and 8A in which deformation membranes 122 are radially spaced apart or away from the outer surface of frame 138. When radially-extending pins 136 push deformable membranes 122 radially outward to the expanded or deformed configuration, deformation haptic effects are thereby applied to a user's hand that is grasping haptic peripheral 102. When radially-extending pins 136 pull deformable membranes 122 radially inward to return to the nominal or non-deformed configuration, deformation haptic effects are removed or not applied.

Thus, haptic output device 120 produces a force that moves deformable membranes 122 relative to frame 138 in response to the control signal from host processor 108 and/or local processor 112 to thereby provide a haptic effect to a user of haptic peripheral 102. The haptic effect, i.e., deformation of deformable membranes 122, may be considered a deformation haptic effect. As used herein, "deformation" haptic effects include effects in which the deformable membranes bend, deform, or otherwise move, thereby resulting in deformation haptic effects that are felt by the user. Deformation haptic effects as produced by embodiments hereof are felt by the user because the deformable membranes are in direct contact with user. Examples of deformation haptic effects include a jolt via a single relatively large deformation in conjunction with a virtual button press or collisions between virtual elements, or vibrations via multiple relatively small deformations in conjunction with movement of virtual elements across the screen, or other types of screen movements. For example of a deformation haptic effect, a user may be wearing virtual reality glasses and playing a video gaming, e.g. baseball, while holding a baseball bat equipped with a haptic output device as described herein with multiple deformable membranes for providing deformable feedback. Every time the user "hits" the ball, the deformable membranes are expanded radially and apply a force to the user's hand such that the user feels which part of the baseball bat "hits" the ball. In another example, a user is playing a video game such as Call of Duty with a Razer Hydra equipped with a haptic output device as described herein with multiple deformable membranes for providing deformable feedback. Every time the user pulls the trigger, the deformable membranes are expanded radially and fast to apply a force to the user's hand. Additional examples of deformation haptic effects include a heartbeat haptic effect in which the deformation of the deformable membranes follows the pattern of a heartbeat signal, in both magnitude and frequency, and/or a breathing haptic effect in which deformation of the deformable membranes follows the pattern of a small living animal which is breathing in your hand in a virtual reality environment. Such haptic feedback or effects allows for a more intuitive, engaging, and natural experience for the user of haptic feedback system 100 and thus interaction between the user and haptic feedback system 100 is considerably enhanced through the tactile feedback provided by the haptic effects.

Figure 9:
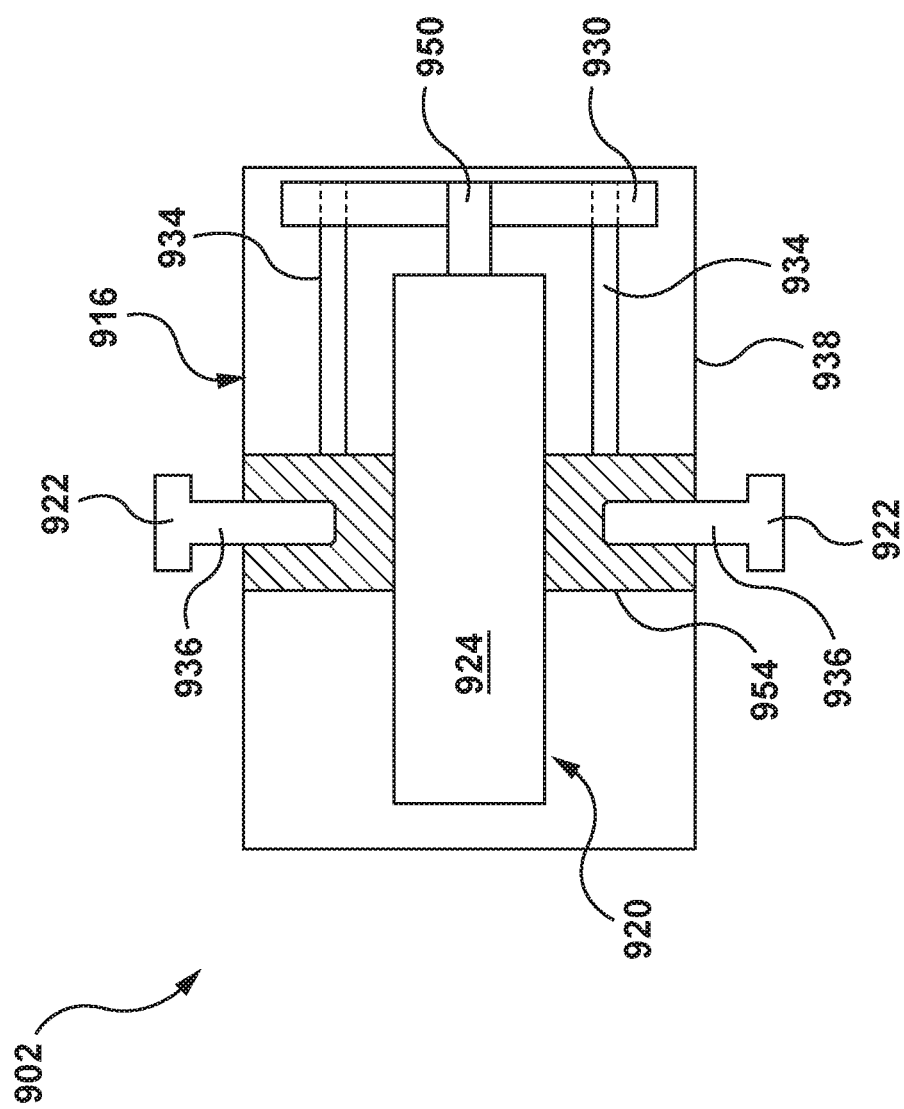
FIG. 9 is a schematic illustration of a haptic peripheral according to another embodiment hereof, wherein a motor of the haptic peripheral is disposed within the frame of the housing of the haptic peripheral.

Although haptic peripheral 102 is illustrated with motor 124 disposed adjacent to or in series with haptic output device 120, embodiments hereof are not limited to this configuration. In another embodiment hereof, the motor of the haptic peripheral is disposed within the haptic output device in order to reduce the size of the haptic peripheral and make the haptic peripheral as compact as possible. For example, as shown in FIG. 9, a schematic illustration of a haptic peripheral 902 having a housing 916 is shown. Housing 916 includes frame 938 which is similar to frame 138 described above. Haptic peripheral 902 also includes a plurality of deformable membranes or coverings 922 which are similar to deformable membranes 122 and haptic output device 920 which is disposed within frame 938 and coupled to the plurality of deformable membranes 922. Haptic output device 920 operates similar to haptic output device 120 and includes motor 924, a camshaft 950, a cam plate 930 coupled to motor 924 via camshaft 950, a plurality of rollers 934, and a plurality of radially-extending shafts or pins 936. As opposed to be disposed adjacent to or in series with the haptic output device, motor 924 is disposed within frame 938 so that a separate motor casing is not required. Haptic peripheral 902 includes a fixture 954 for holding or securing motor 924 concentrically within frame 938 and the plurality of radially-extending shafts or pins 936. Fixture 954 has a structure similar to frame 138 in that fixture 954 encapsulates a plurality of radially-extending shafts or pins similar to how frame 138 encapsulates the plurality of radially-extending pins 136.

Figure 10:
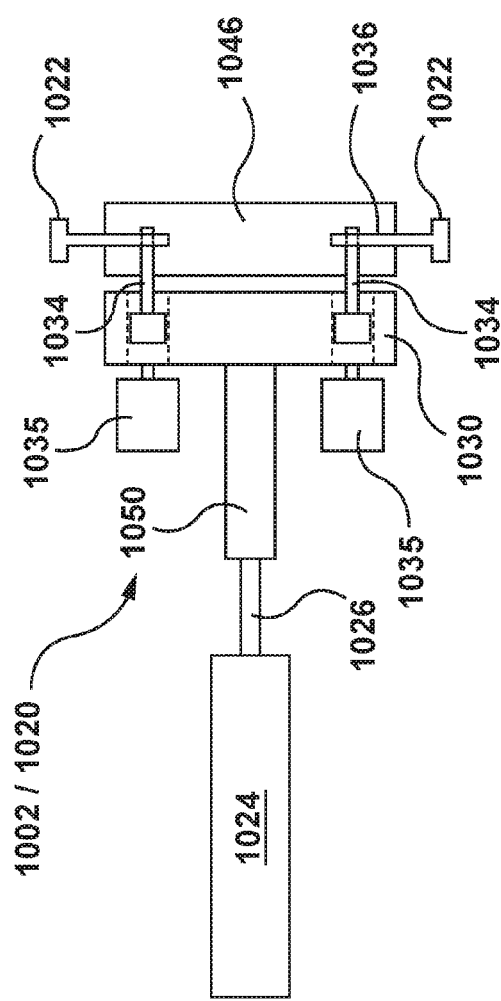
FIG. 10 is a schematic illustration of a haptic peripheral according to another embodiment hereof, wherein deformable membranes of the haptic peripheral are configured to be independently or separately deformed or expanded.
Figure 10A:
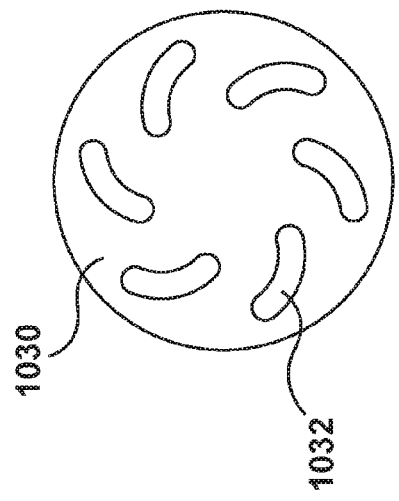
FIG. 10A is a top view of a cam plate of the haptic peripheral of FIG. 10.

In another embodiment hereof, the haptic output device may be modified such that the deformable membranes are individually actuatable, i.e., each deformable membrane is configured to be independently or separately deformed or extended. For example, as shown in FIG. 10, a schematic illustration of a haptic peripheral 1002 having a haptic output device 1020 is shown. Haptic peripheral 1002 also includes a plurality of deformable membranes or coverings 1022 which are similar to deformable membranes 122 and haptic output device 1020 which is coupled to the plurality of deformable membranes 1022. Similar to haptic output device 120, haptic output device 1020 includes motor 1024, a camshaft 1050, a cam plate 1030 coupled to motor 1024 via camshaft 1050, a plurality of rollers 1034, and a plurality of radially-extending shafts or pins 1036. Motor 1024 can be connected directly to camshaft 1050, such as with a shaft coupler 1026. Although the frame of haptic peripheral 1002 is not shown for sake of clarity, a central plate or disc 1046 of plate having a plurality of radially-extending openings or passageways formed therein for receiving the plurality of radially-extending shafts or pins 1036 is shown on FIG. 10. Similar to cam plate 130, cam plate 1030 defines a plurality of tracks 1032 there-through. As best shown in FIG. 10A, each track 1032 is a curved opening or otherwise stated is an opening that forms a curved or kidney-shaped path or passageway. Each roller 1034 is coupled to a relay or solenoid 1035, each relay 1035 being configured to selectively engage or disengage its respective roller 1034 such that the roller is selectively positioned within one of the plurality of tracks 1032 of cam plate 1030. When a roller 1034 is engaged via its relay 1035, the roller is positioned into its track 1032 and its respective deformable membrane 1022 may be deformed or radially extended. Conversely, when a roller 1034 is disengaged via its relay 1035, the roller is not positioned into its track 1032 and its respective deformable membrane 1022 may not be deformed or radially extended. Thus, the plurality of relays 1035 to engage and disengage the plurality of rollers 1034 inside cam plate 1030 result in haptic output device 1020 having multiple independently-actuatable deformation regions. In an embodiment, relays 1035 are linear solenoids commercially available under the Ledex brand, other relays 1035 may alternatively be custom designed.

Figure 11:
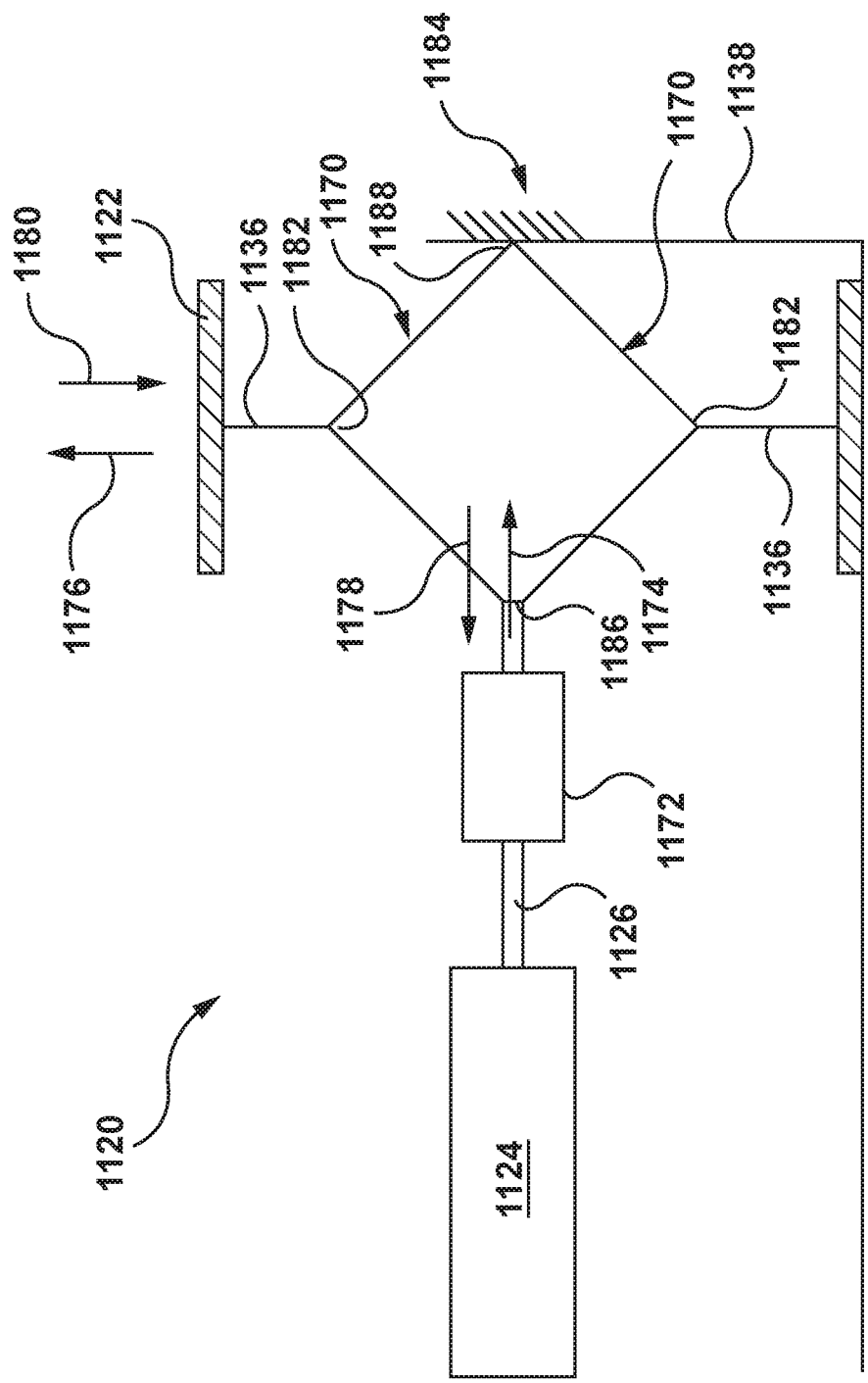
FIG. 11 is a schematic illustration of a haptic peripheral according to another embodiment hereof, wherein a ball screw and a plurality of flexures are utilized to convert rotary motion of a motor into linear motion of a plurality of deformable membranes.
Figure 12:
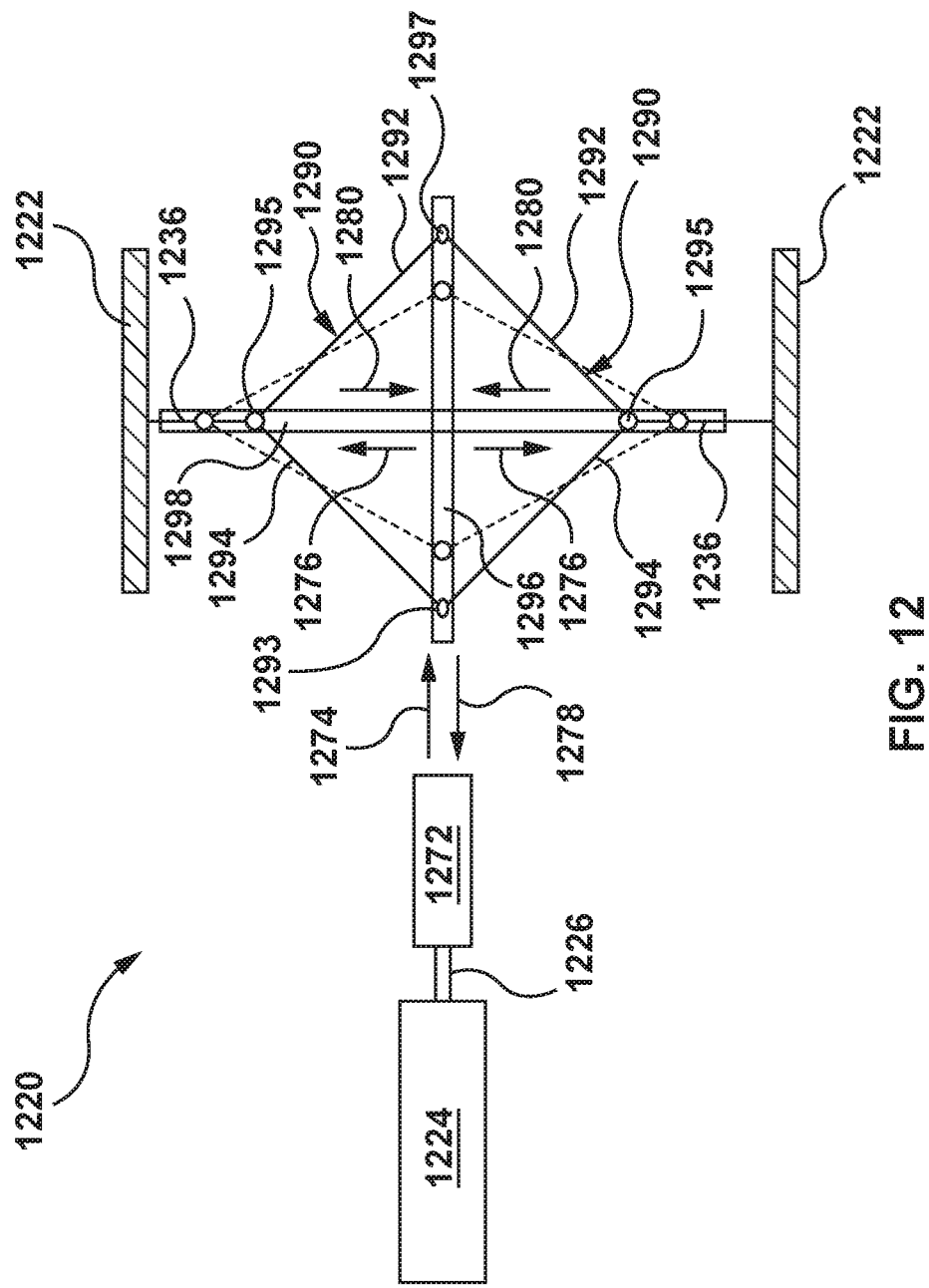
FIG. 12 is a schematic illustration of a haptic peripheral according to another embodiment hereof, wherein a ball screw and a plurality of flexures are utilized to convert rotary motion of a motor into linear motion of a plurality of deformable membranes.

In the above embodiments, the cam plate and rollers may be considered a converter that extends between a motor and a plurality of radially-extending pins and is used to convert rotary motion of the motor into linear motion that is applied to the radially-extending pins. More particularly, the converter converts rotary motion of the motor to linear motion to move the plurality of radially-extending pins to thereby radially extend the deformable membranes relative to the housing and provide a haptic effect to a user of the haptic peripheral. FIG. 11 and FIG. 12 each illustrate an embodiment having a converter according to another embodiment hereof for converting rotary motion of the motor into linear motion that is applied to the radially-extending pins.

More particularly, in the embodiment of FIG. 11, a ball screw 1172 and a plurality of flexures 1170 are utilized to convert rotary motion of a motor into linear motion of a plurality of radially-extending pins 1136. Haptic output device 1120 includes a motor 1124, ball screw 1172, the plurality of flexures 1170, and the plurality of radially-extending shafts or pins 1136. Motor 1124 can be connected directly to ball screw 1172, such as with a shaft coupler 1126. Ball screw 1172 is commercially available and is a mechanical linear actuator that translates rotational motion to linear motion with little friction via a threaded shaft that provides a helical raceway for ball bearings which act as a precision screw. Each flexure 1170 is a rod or shaft component having a first end 1186 coupled or attached to ball screw 1172 to move therewith and a second or opposing end 1188 fixed and attached to a frame 1138 that is configured to be held by the user in their hand. Fixation of end(s) 1188 is represented by reference number 1184 on FIG. 11, and second end(s) 1188 do not move during operation of haptic output device 1120. Radially-extending pins 1136 are attached to each flexure 1170 at an intermediate point 1182 along the length of the flexure in order to radially extend deformable membranes 1122 relative to the housing (not shown in FIG. 11). In an embodiment, intermediate point 1182 is approximately in the middle or center of the length of flexure 1170.

During operation of motor 1124, ball screw 1172 moves back and forth as indicated by directional arrows 1174 and 1178. When ball screw 1172 moves away from motor 1124 as indicated by directional arrow 1174, the distance between opposing ends 1186, 1188 of each flexure is reduced or decreased and flexure 1170 bends or bows radially outward such that intermediate point 1182 extends radially outward, thereby radially extending the plurality of radially-extending pins and the deformable membranes attached thereto. When ball screw 1172 moves towards motor 1124 as indicated by directional arrow 1178, the distance between opposing ends 1186, 1188 is increased and flexure 1170 straightens or bends radially inward such that intermediate point 1182 extends radially inward, thereby radially retracting the plurality of radially-extending pins and the deformable membranes attached thereto. As such, in this embodiment, the converter that converts rotary motion of the motor to linear motion is ball screw 1172 and the plurality of flexures 1170. Motor 1124 is configured to rotate ball screw 1172 relative to the housing in response to the control signal from the host processor and/or the local processor and rotation of ball screw 1172 moves the plurality of flexures 1170 and plurality of radially-extending pins 1136 in order to radially extend the deformable membranes relative to the housing as described above.

In the embodiment of FIG. 12, a ball screw 1272 and a plurality of flexures 1290 are utilized to convert rotary motion of a motor into linear motion of a plurality of deformable membranes 1222. Haptic output device 1220 includes a motor 1224, ball screw 1272, the plurality of flexures 1290, and plurality of radially-extending shafts or pins 1236. Motor 1224 can be connected directly to ball screw 1272, such as with a shaft coupler 1226. Similar to ball screw 1172, ball screw 1272 is commercially available and is a mechanical linear actuator that translates rotational motion to linear motion with little friction via a threaded shaft that provides a helical raceway for ball bearings which act as a precision screw. In this embodiment, a horizontal or first linear guide 1296 extends from ball screw 1172 and a vertical or second linear guide 1298 extends perpendicular to first linear guide 1296. Each flexure 1290 includes two linkages, a first linkage 1294 and a second linkage 1296 joined together at an apex or hinge 1295. First and second linkages 1294, 1296 are slidingly disposed over first and second linear guides 1296, 1298 with a first end 1293 of first linkage 1294 being slidingly disposed over first guide 1296, a first end 1297 of second linkage 1292 being slidingly disposed over first guide 1296 and spaced apart from first end 1293 of first linkage 1294, and apex or hinge 1295 being slidingly disposed over second linkage 1298.

During operation of motor 1224, ball screw 1272 moves back and forth as indicated by directional arrows 1274 and 1278. First end(s) 1293 of first linkage 1294 is coupled to ball screw 1272 to move therewith. When ball screw 1272 moves away from motor 1224 as indicated by directional arrow 1274, hinge(s) 1295 of linkage(s) 1290 move radially outward as indicated by directional arrow 1276, thereby radially extending plurality of radially-extending pins 1236 and deformable membranes 1222 attached thereto. Stated another way, as shown in phantom on FIG. 12, when ball screw 1272 moves away from motor 1224 as indicated by directional arrow 127, first and second ends 1293, 1297 of first and second linkages 1294, 1292, respectively move toward each other or closer together due to symmetry of flexure 1290. When ball screw 1272 moves towards from motor 1224 as indicated by directional arrow 1278, hinge(s) 1295 of linkage(s) 1290 move radially inward as indicated by directional arrow 1280, thereby radially retracting the plurality of radially-extending pins 1236 and deformable membranes 1222 attached thereto. Flexures 1290 convert the horizontal movement of ball screw 1272 along horizontal or first linear guide 1296 into vertical movement along vertical or second linear guide 1298 in order to radially expand and retract the plurality of radially-extending pins 1236 and deformable membranes 1222 attached thereto. As such, in this embodiment, the converter that converts rotary motion of the motor to linear motion is ball screw 1272 and the plurality of flexures 1290. Motor 1224 is configured to rotate ball screw 1272 relative to the housing in response to the control signal from the host processor and/or the local processor and rotation of ball screw 1272 moves or slides the plurality of flexures 1290 and the plurality of radially-extending pins 1236 in order to radially extend deformable membranes 1222 relative to the housing as described above.

As previously stated, haptic peripheral 102 is merely an exemplary embodiment of a haptic peripheral and that haptic peripherals with other configurations, shapes, and sizes may be used. Those skilled in the art would recognize that haptic peripheral 102 may be incorporated into various types of controllers, including but not limited to graspable controllers shaped as real life objects (such as tennis rackets, golf clubs, baseball bats, and the like) and other shapes. In addition, FIGS. 13-14 illustrate another embodiment hereof in which the haptic peripheral is a gaming tablet controller 1302 that may be used with a tablet computer 1304. Tablet computer 1304 may be designed specifically for gaming activities, such as is available from Razer Inc., or may be a tablet computer well known and available in the market, such as an Apple® Ipad®, Kindle® Fire®, and Samsung® Galaxy Tab®. Gaming tablet controller 1302 includes a docking portion 1360 configured to receive tablet computer 1304 and handles 1362, 1364 with user input elements disposed thereon for a user to control a game on tablet computer 1304. Docking portion 1360 connects gaming tablet controller 1302 to tablet computer 1304 such that actions by the user on handles 1362, 1364 such as pressing buttons, moving joysticks, pressing triggers, etc., result in actions on the game being played on tablet computer 1304. Handles 1362, 1364 of haptic peripheral 1302 are shaped to easily accommodate two hands gripping the device, either by a left-handed user or a right-handed user, and haptic output device 1320 and deformable membranes 1322 are incorporated onto handles 1362, 1364 in a location where a hand or palm of the user is generally located to provide deformation haptic effects to the user. Haptic output device 1320 is similar to haptic output device 120 described above, and deformable membranes 1322 are similar to deformable membranes 122 described above.

Handles 1362, 1364 include typical user input elements found on controllers. The user input elements will be described with respect to handle 1364. However, those skilled in the art would recognize that the same or similar user input elements may be used on handle 1362. In particular, handle 1364 includes a joystick 1340, a button 1342, and a trigger 1346. As can be seen in FIG. 13 and known to those skilled in the art, more than one of each of these user input elements may be included on each handle 1362, 1364. Further, handle 1364 includes a general or rumble haptic output device 1318 attached thereto for providing general or rumble haptic effects to gaming tablet controller 1302 as described above with respect to general or rumble haptic output device 1318.

FIG. 14 illustrates a block diagram of the gaming tablet controller of FIG. 13 in accordance with an embodiment. As shown in FIG. 14, gaming tablet controller 1302 includes a local processor 1312 which communicates with tablet computer 1304 via docking portion 1360. Other connections, such as wired or wireless connections, may be used instead of docking portion 1360. Tablet computer 1304 in this embodiment includes a display screen. Gaming tablet controller 1302 may be alternatively configured to not include local processor 1312, whereby all input/output signals from gaming tablet controller 1302 are handled and processed directly by tablet computer 1304.

Local processor 1312 is coupled to joystick 1340, button 1342, and trigger 1346, and to position sensors 1341, 1343, and 1347 that may be coupled to joystick 1340, buttons 1342, and trigger 1346, respectively. The block diagram of FIG. 17 shows only one (1) of each of joystick 1340, button 1342, and trigger 1346. However, those skilled in the art would understand that multiple joysticks, buttons, and triggers, as well as other user input elements, may be used, as described above. Targeted actuators or haptic output devices 1350, 1352, 1356 are coupled to joystick 1340, button 1342, and trigger 1346, respectively. Targeted haptic output devices 1350, 1352, 1356 and general haptic output device 1330 are also coupled to local processor 1312, which provides control signals to the haptic output devices 1350, 1352, 1356, 1330 based on high level supervisory or streaming commands from tablet computer 1304. In the streaming embodiment, the voltage magnitudes and durations are streamed to gaming tablet controller 1302 where information is provided by the tablet computer 1304 to the actuators. In operation, tablet computer 1304 may provide high level commands to the local processor 1312 such as the type of haptic effect to be output (e.g. vibration, jolt, detent, pop, etc.) by one or more selected actuators, whereby local processor 1312 instructs the actuator as to particular characteristics of the haptic effect which is to be output (e.g. magnitude, frequency, duration, etc.). Local processor 1312 may retrieve the type, magnitude, frequency, duration, or other characteristics of the haptic effect from a memory 1314 coupled to local processor 1312. The haptic effects provide the user with a greater sense of immersion to the game as multiple modalities are being simultaneously engaged, e.g., video, audio, and haptics.

In addition to the tablet configuration of FIGS. 13-14, deformable membranes and haptic output devices coupled thereto as described herein may be incorporated into any type of haptic peripheral in a location where a hand or finger of the user is generally located to provide deformation haptic effects to the user. In addition, deformable membranes and haptic output devices coupled thereto as described herein may be incorporated onto wearable peripherals to provide deformation haptic effects to the body of the user. The scale and relative dimensions of the deformable membranes will vary depending upon application, i.e., depending upon whether the deformable membranes are configured to contact a user's finger, a user's palm, or a different portion of a user's body.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. For example, haptic peripheral 102 may be modified to include a general haptic output device in addition to haptic output device 120, the general haptic output device being positioned within housing 116 and configured to provide vibrational haptic effects to the user in addition to the deformation haptic effects provided by haptic output device 120. As understood by one of ordinary skill in the art, a general haptic output device serves to provide the entire housing of a haptic peripheral with general or rumble haptic feedback. A general haptic output device is configured to receive a second control signal from host processor 108 and/or local processor 112 and output a second haptic effect to housing 116 in response to the second control signal. The general haptic output device receives control signals from host processor 108 and/or local processor 112 based on high level supervisory or streaming commands from host computer 104. For example, when in operation, voltage magnitudes and durations are streamed from host computer 104 to haptic peripheral 102 where information is provided to the general haptic output device via local processor 112. Host computer 104 may provide high level commands to local processor 112 such as the type of haptic effect to be output (e.g. vibration, jolt, detent, pop, etc.) by the general haptic output device, whereby the local processor 112 instructs the general haptic output device as to particular characteristics of the haptic effect which is to be output (e.g. magnitude, frequency, duration, etc.). The general haptic output device may include electromagnetic motors, eccentric rotating mass ("ERM") actuators in which an eccentric mass is moved by a motor, linear resonant actuators ("LRAs") in which a mass attached to a spring is driven back and forth, vibrotactile actuators, other suitable types of actuating devices. The general haptic output device is implemented as an inertial actuator to provide vibrotactile feedback to the user. Thus, haptic output device 120 provides a variety of deformation haptic effects or sensations to the user that are independent of and complementary to general or rumble haptic feedback produced by the general haptic output device.

Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic peripheral comprising:
a housing including a frame having a plurality of spaced apart windows;
a plurality of deformable membranes, each deformable membrane positioned within one of the plurality of spaced apart windows of the frame; and
a haptic output device disposed within the housing and coupled to the plurality of deformable membranes, the haptic output device including a motor, a cam plate coupled to the motor and having a plurality of tracks defined therethrough, a plurality of rollers, and a plurality of radially-extending pins, each roller slidably positioned within one of the plurality of tracks of the cam plate and each radially-extending pin having a first end attached to one of the plurality of rollers and a second opposing end attached to one of the deformable membranes,
wherein the motor is configured to receive a control signal from a processor and is configured to rotate the cam plate relative to the housing in response to the control signal from the processor and rotation of the cam plate moves the plurality of rollers and the plurality of radially-extending pins to thereby radially extend the deformable membranes relative to the housing and provide a haptic effect to a user of the haptic peripheral.

2. The haptic peripheral of claim 1, wherein the frame includes a first annular base, a second opposing annular base, and a plurality of slats longitudinally extending between the first and second annular bases.

3. The haptic peripheral of claim 2, wherein the frame of the housing also includes a central disc having a plurality of radially-extending passageways formed therein and each radially-extending pin of the haptic output device is slidably positioned within one of the plurality of radially-extending passageways of the central disc.

4. The haptic peripheral of claim 1, wherein the haptic peripheral includes at least six deformable membranes.

5. The haptic peripheral of claim 1, wherein each deformable membrane is configured to contact a user and is formed from a polymer material.

6. The haptic peripheral of claim 1, wherein the tracks of the cam plate are curved openings.

7. The haptic peripheral of claim 1, wherein the haptic output device further includes a plurality of relays, each relay configured to selectively engage or disengage one of the rollers such that the roller is selectively positioned within one of the plurality of tracks of the cam plate.

8. The haptic peripheral of claim 1, wherein the housing includes a motor casing adjacent to the frame and the motor of the haptic output device is disposed within the motor casing.

9. The haptic peripheral of claim 1, wherein the motor is disposed within the frame.

10. A haptic peripheral comprising:
a housing including a frame having a plurality of spaced apart windows;
a plurality of deformable membranes, each deformable membrane positioned within one of the plurality of spaced apart windows of the frame; and
a haptic output device disposed within the housing and coupled to the plurality of deformable membranes, the haptic output device including a motor, a converter, and a plurality of radially-extending pins, the converter extending between the motor and the plurality of radially-extending pins and each radially-extending pin having a first end attached to the converter and a second opposing end attached to one of the deformable membranes,
wherein the motor is configured to receive a control signal from a processor and is configured to rotate relative to the housing in response to the control signal from the processor and the converter converts rotary motion of the motor to linear motion to move the plurality of radially-extending pins to thereby radially extend the deformable membranes relative to the housing and provide a haptic effect to a user of the haptic peripheral.

11. The haptic peripheral of claim 10, wherein the converter includes a cam plate coupled to the motor and having a plurality of tracks defined therethrough and a plurality of rollers, each roller slidably positioned within one of the plurality of tracks of the cam plate, wherein the motor is configured to rotate the cam plate relative to the housing in response to the control signal from the processor and rotation of the cam plate moves the plurality of rollers and the plurality of radially-extending pins in order to radially extend the deformable membranes relative to the housing.

12. The haptic peripheral of claim 10, wherein the converter includes a ball screw coupled to the motor and a plurality of flexures, each flexure having a first end coupled to the ball screw and a second end fixed to the frame, and each radially-extending pin having a first end attached to an intermediate point of one of the plurality of flexures and a second opposing end attached to one of the deformable membranes, wherein the motor is configured to rotate the ball screw relative to the housing in response to the control signal from the processor and rotation of the ball screw bends the flexures such that the intermediate point of the flexure and the radially-extending pin attached thereto extends radially outward in order to radially extend the deformable membranes relative to the housing.

13. The haptic peripheral of claim 10, wherein the converter includes a ball screw coupled to the motor and a plurality of flexures, each flexure having a first end coupled to the ball screw, a second end slidingly disposed over a first linear guide, and a hinge disposed between the first and second ends thereof and slidingly disposed over a second linear guide disposed perpendicular to the first linear guide and each radially-extending pin having a first end attached to the hinge of one of the plurality of flexures and a second opposing end attached to one of the deformable membranes, wherein the motor is configured to rotate the ball screw relative to the housing in response to the control signal from the processor and rotation of the ball screw moves the plurality of flexures and the plurality of radially-extending pins in order to radially extend the deformable membranes relative to the housing.

14. The haptic peripheral of claim 10, wherein the frame includes a first annular base, a second opposing annular base, and a plurality of slats longitudinally extending between the first and second annular bases.

15. The haptic peripheral of claim 14, wherein the frame of the housing also includes a central disc having a plurality of radially-extending passageways formed therein and each radially-extending pin of the haptic output device is slidably positioned within one of the plurality of radially-extending passageways of the central disc.

16. The haptic peripheral of claim 10, wherein the haptic peripheral includes at least six deformable regions.

17. The haptic peripheral of claim 10, wherein the housing includes a motor casing adjacent to the frame and the motor of the haptic output device is disposed within the motor casing.

18. A gaming system comprising:
a host computer;
a processor; and
a haptic peripheral including
    a housing including a frame having a plurality of spaced apart windows,
    a plurality of deformable membranes, each deformable membrane positioned within one of the plurality of spaced apart windows of the frame, and
    a haptic output device disposed within the housing and coupled to the plurality of deformable membranes, the haptic output device including a motor, a converter, and a plurality of radially-extending pins, the converter extending between the motor and the plurality of radially-extending pins and each radially-extending pin having a first end attached to the converter and a second opposing end attached to one of the deformable membranes, wherein the motor is configured to receive a control signal from the processor and is configured to rotate relative to the housing in response to the control signal from the processor and the converter converts rotary motion of the motor to linear motion to move the plurality of radially-extending pins to thereby radially extend the deformable membranes relative to the housing and provide a haptic effect to a user of the haptic peripheral.

19. The gaming system of claim 18, wherein the processor is located within the housing of the haptic peripheral.

20. The gaming system of claim 18, wherein the processor is disposed in the host computer.

* * * * *